United States Patent [19]

Mantegazza et al.

[11] Patent Number: 5,320,819
[45] Date of Patent: Jun. 14, 1994

[54] DIRECT CATALYTIC PROCESS FOR THE PRODUCTION OF HYDROXYLAMINE

[75] Inventors: Maria A. Mantegazza, Monza; Mario Padovan, Milan; Guido Petrini, Galliate; Paolo Roffia, Saronno, all of Italy

[73] Assignee: Enichem Anic S.r.l., Palermo, Italy

[21] Appl. No.: 907,679

[22] Filed: Jul. 2, 1992

[30] Foreign Application Priority Data

Jul. 10, 1991 [IT] Italy ................. MI91 A 001915

[51] Int. Cl.$^5$ ............................................. C01B 21/20
[52] U.S. Cl. .................................................. 423/387
[58] Field of Search ......................................... 423/387

[56] References Cited

FOREIGN PATENT DOCUMENTS 0208311 1/1987 European Pat. Off. .
0314147 5/1989 European Pat. Off. .
0347926 12/1989 European Pat. Off. .

OTHER PUBLICATIONS

European Search Report (Apr., 1991).
Journal of Molecular Catalysis, vol. 69, 1991, pp. 383–392, J. Sudhakar Reddy et al. (no month).

Primary Examiner—Wayne Langel
Attorney, Agent, or Firm—Hedman, Gibson & Costigan

[57] ABSTRACT

Direct catalytic process for the production of hydroxylamine by means of the oxidation of ammonia with $H_2O_2$, wherein the catalyst is composed of silicon, titanium and oxygen and has a crystalline (as in the case of titanium-silicalites, for example) or amorphous structure.

20 Claims, No Drawings

DIRECT CATALYTIC PROCESS FOR THE PRODUCTION OF HYDROXYLAMINE

The invention relates to a direct catalytic process for the production of hydroxylamine from ammonia and hydrogen peroxide in the liquid phase.

The various processes which have been carried out so far are based on the reduction (to hydroxylammonium salts) of derivatives of nitrogen at a higher oxidation state, such as nitrogen oxides, nitrites or nitrates, obtained, as is known, by the oxidation of ammonia with oxygen. This reduction can take place by means of catalytic hydrogenation; processes of this kind are described for example in German Patent 3130305, concerning the catalytic hydrogenation of NO to hydroxylamine sulfate (with catalysts based on Pt on graphite carriers), or English Patent 1528117, concerning the catalytic hydrogenation of nitrates or NO in an acidic medium with catalysts based on Pt and/or Pd. One of the disadvantages of these processes is the risk of the formation of explosive mixtures $N_2O + H_2$ and also the necessity of regenerating the catalyst, a laborious process.

Furthermore, the coproduction of ammonium salts is inevitable, both in the reduction stage and subsequently, when the hydroxylammonium salts are used for the synthesis of various compounds, such as oximes, hydroxamic acids, etc., both during the production of solutions of free hydroxylamine in water (as described for example in German Patent 3608495) or in alcohol, as described in European Patent 108294. In all these processes the synthesis of hydroxylamine from ammonia occurs in two stages:

oxidation of the ammonia to nitrogen oxides ($NO_x$);
reduction to hydroxylammonium salts.

There is consequently the necessity of developing a process for the production of hydroxylamine by the direct oxidation of ammonia, without any intermediate stage.

The Applicant has now found that ammonia can be directly oxidized to hydroxilamine with $H_2O_2$, both in a simple and rapid way, provided that a particular catalyst is present.

In its widest aspect, the invention relates to a direct catalytic process for the production of hydroxylamine by means of the oxidation of ammonia with hydrogen peroxide, in the liquid phase, wherein the catalyst is composed of silicon, titanium and oxygen and the structure of said catalyst is crystalline or amorphous. Preferred catalysts are titanium-silicalites and mixed oxides (amorphous) silica-titanium, hereinafter referred to as $SiO_2$-$TiO_2$.

A first group of titanium-silicalites are defined in European Patent publication EP-A-0311983 and in U.S. Pat. No. 4,410,501; the mixed oxides $SiO_2$-$TiO_2$ are described for example in European Patent publication 347926; a second group of titanium-silicalites (titanium-silicalites 2) are described in Belgian Patent 1.001.038 (1989) and in a paper published in APPLIED CATALYSIS, Volume 58, L1–L4 (1990).

According to the present invention there are different ways of carrying out the oxidation of ammonia with $H_2O_2$; the reaction medium can be an organic solvent, water or a mixture of organic solvent and water to which dilute hydrogen peroxide and ammonia, either gaseous or in an aqueous solution, are added.

The organic solvent can be miscible or immiscible with water, such as $C_1$-$C_6$ aliphatic or cycloaliphatic alcohols (for example methanol, ethanol, propanol, n-butanol, isobutanol and cyclohexanol) or aliphatic and aromatic hydrocarbons having from 5 to 8 carbon atoms, for example toluene. Good results have been obtained using a tertiary alcohol as a solvent, in particular t-butyl or t-amyl alcohol.

The ratio in volume between the organic solvent and water however added can have any value; it is preferable however to operate with a total ratio (in volume) solvent/water ranging from 0.5 to 200, and preferably from 4 to 50.

The ammonia may be added in gaseous form or as an aqueous solution, in a concentration of 35 to 1% by weight, preferably 30 to 5%.

The pressure at which the process is carried out has the purpose of guaranteeing the solubility of the ammonia in the reaction medium. Generally autogenous pressure is applied; it is also possible to operate at a higher pressure, under the pressure of an inert gas.

For the purposes of the reaction, the hydrogen peroxide is used as an aqueous solution in a concentration of 70 to 1% by weight, preferably 35 to 1% by weight, as it is or mixed with an organic solvent.

The reaction temperatures generally range from 25° to 150° C., preferably from 40° to 120° C.

The catalyst is used in a well dispersed form in the reaction medium either as crystals, as resulting from the zeolite synthesis, or in the form of microspheres, prepared as described in the U.S. Pat. No. 4,701,428. In the latter case the particle size distribution can range from 5 to 100 microns. The catalyst concentration in the reaction medium is comprised between 0.1 to 40 parts by weight, preferably between 1 to 10 parts every 100 parts of solution.

As a general rule it is possible to operate in a molar ratio between the two reagents (ammonia and hydrogen peroxide) ranging from 200 to 0.5, preferably 160 to 0.9.

The process of the present invention can be batch, semicontinuous (with continuous feeding of hydrogen peroxide only) or continuous with the continuous feeding of both reagents and the organic solvent. The reaction effluent consists of a slurry which must be filtered to recover the catalyst, which is recycled to the reactor; if the filtrating element is situated inside the reactor, as in the case of a bayonet filter, it is possible to recover an effluent composed of a solution of ammonia, of the reaction product and the possible solvent. This solution can be used for example for the oximation process of a carbonylic compound (ketone or aldehyde); among the other uses of hydroxylamine it is worth mentioning the stabilization of natural rubber, its use as a polymerization regulator and inhibitor (as well as analytic reagent) and the treatment of radioactive materials (plutonium). The following examples provide a The following examples provide a better illustration of the present invention but do not limit it in any way.

EXAMPLE 1

1.5 g of a catalyst composed of a titanium-silicalite of type 1, prepared according to the procedure described in U.S. Pat. No. 4,410,501, 50 cm³ of aqueous ammonia (15% by weight) and 50 cm³ of t-butanol are fed, in an inert atmosphere, into a 200 cm³ glass reactor, equipped with a temperature controlling device and a stirrer.

The slurry is heated up to 80° C. and 1.39 g of dilute $H_2O_2$ (32.7% by weight) are fed, by a metering pump under stirring, over a period of 30 minutes; at the end of the reaction the catalyst is filtered off and a 63.7% hydroxylamine yield (referred to $H_2O_2$) is obtained.

EXAMPLE 2

6 g of a catalyst composed of microspheres of titanium silicalite, prepared according to the procedure described in the Example 1 of the Italian patent application N. 20457 A/85, and 100 cm$^3$ of aqueous ammonia (7% by weight) are fed into the reactor of Example 1. 1.43 g of dilute $H_2O_2$ are fed at 80° C., over a period of 45 minutes; there was a 60.5% hydroxylamine yield (referred to $H_2O_2$).

EXAMPLE 3

7.5 g of the catalyst $SiO_2$-$TiO_2$, prepared as described in Example 1 of European Patent 347926, 50 cm$^3$ of aqueous ammonia (15% by weight) and 50 cm$^3$ of t-butanol are fed into the reactor of Example 1. 1.37 g of dilute $H_2O_2$ are fed at 80° C., over a period of 30 minutes; there was a 21.3% hydroxylamine yield (referred to $H_2O_2$).

EXAMPLE 4

1.5 g of the same catalyst as in Example 2, 50 cm$^3$ of aqueous ammonia (15% by weight) and 50 cm$^3$ of t-butanol are fed into the reactor of Example 1. 3.76 g of dilute $H_2O_2$ are fed at 80° C., over a period of 50 minutes; there was a 47.7% hydroxylamine yield (referred to $H_2O_2$).

EXAMPLE 5

3 g of the same catalyst as in Example 2, 50 cm$^3$ of aqueous ammonia (15% by weight) and 50 cm$^3$ of toluene are fed into the reactor of Example 1. 2.55 g of dilute $H_2O_2$ are fed at 80° C., over a period of 70 minutes; there was a 51.0% hydroxylamine yield (referred to $H_2O_2$).

Data and results are shown in Table 1.

TABLE 1

| Example | Catalyst (g) | Organic solvent | $H_2O_2$ (g) | Yield* (%) |
|---|---|---|---|---|
| 1 | Ti-silicalite 1.5 | t-butanol | 1.39 | 63.7 |
| 2 | Ti-silicalite 6.0 | — | 1.43 | 60.5 |
| 3 | $SiO_2$—$TiO_2$ 7.5 | t-butanol | 1.37 | 21.3 |
| 4 | Ti-silicalite 1.5 | t-butanol | 3.76 | 47.7 |
| 5 | Ti-silicalite 3.0 | toluene | 2.55 | 51.0 |

* = moles of $NH_2OH$ obtained on every 100 moles of fed $H_2O_2$.

EXAMPLE 6

3 g of a catalyst composed of titanium-silicalite-2, prepared according to a paper published in Applied Catalysis, Volume 58, L1-L4 (1990), 50 cm$^3$ of aqueous ammonia (15% by weight) and 50 cm$^3$ of t-butanol are fed into the reactor of Example 1. 1.45 g of dilute $H_2O_2$ are fed at 80° C., over a period of 20 minutes; there was a 47.1% hydroxylamine yield (referred to $H_2O_2$).

EXAMPLE 7

1.5 g of the same catalyst as in Example 2, 50 cm$^3$ of aqueous ammonia (15% by weight) and 50 cm$^3$ of t-butanol are fed into the reactor of Example 1. 1.11 g of dilute $H_2O_2$ are fed at 70° C., over a period of 1 minute; after 15 minutes of reaction the hydroxylamine yield was 66.9% (referred to $H_2O_2$).

Data and results are shown in Table 2.

EXAMPLE 8

1 g of the same catalyst as in Example 2, 50 cm$^3$ of aqueous ammonia (15% by weight) and 50 cm$^3$ of t-butanol are fed into the reactor of Example 1. 2.32 g of dilute $H_2O_2$ are fed at 80° C., over a period of 1 minute; after 15 minutes of reaction, the hydroxylamine yield was 59.2% (referred to $H_2O_2$).

Data and results are shown in Table 2.

EXAMPLE 9

1.5 g of the same catalyst as in Example 2, 50 cm$^3$ of aqueous ammonia (15% by weight) and 50 cm$^3$ of t-butanol are fed into the reactor of Example 1. 5.58 g of dilute $H_2O_2$ are fed at 70° C., over a period of 15 minutes; after 15 minutes of reaction, the hydroxylamine yield was 40.8% (referred to $H_2O_2$).

The data and results are shown in Table 2.

EXAMPLE 10

1.5 g of the same catalyst as in Example 2, 50 cm$^3$ of aqueous ammonia (15% by weight) and 50 cm$^3$ of t-butanol are fed into the reactor of Example 1. 0.30 g of dilute $H_2O_2$ are fed at 70° C., over a period of 5 minutes; after 15 minutes of reaction, the hydroxylamine yield was 75.1% (referred to $H_2O_2$).

Data and results are shown in Table 2.

TABLE 2

| Ex | $H_2O_2$ (g) | T (°C.) | $H_2O_2$ feed | time (minutes) reaction | $NH_3/H_2O_2$ ratio (*) | Yield (%) |
|---|---|---|---|---|---|---|
| 7 | 1.11 | 70 | 1 | 15 | 88 | 66.9 |
| 8 | 2.32 | 80 | 1 | 15 | 18 | 59.2 |
| 9 | 5.58 | 70 | 15 | 15 | 8 | 40.8 |
| 10 | 0.30 | 70 | 5 | 15 | 142 | 75.1 |

(*) = approx. indicative value

EXAMPLE 11 (comparative without catalyst).

50 cm$^3$ of aqueous ammonia (15% by weight) and 50 cm$^3$ of t-butanol are fed into the reactor of Example 1. 2.58 g of dilute $H_2O_2$ are fed at 80° C., over a period of 1 hour; the hydroxylamine yield was 0.5% (referred to $H_2O_2$).

EXAMPLE 12

In a 1.2 l stainless steel reactor, equipped with a temperature controlling device and a stirrer, 12.1 g of the same catalyst as in Example 2, 655 cm$^3$ of t-butanol, 130 cm$^3$ of water and 180 g of gaseous ammonia are fed. 5.26 g of concentrated $H_2O_2$ (54.15% by weight) mixed with 10.54 g of t-butanol, are fed at 80° C., over a period of 1 minute, under an autogenous pressure of 13.6 bars; after 30 minutes of reaction the hydroxylamine yield was 82.9% (referred to $H_2O_2$).

We claim:
1. A direct catalytic process for the production of hydroxylamine said process comprising reacting a mixture which consists essentially of ammonia, hydrogen peroxide, an organic solvent and a crystalline or amorphous catalyst which consists essentially of silicon, titanium and oxygen.
2. The process of claim 1, wherein said catalyst is a titanium-silicalite of type 1.
3. The process of claim 1, wherein the catalyst is a titanium-silicalite of type 2.

4. The process of claim 1, wherein the catalyst is a mixed amorphous oxide $SiO_2$-$TiO_2$.

5. The process according to claim 1, wherein the ammonia is fed in the form of gas or aqueous solution, with a concentration of 35 to 1% by weight.

6. The process of claim 1, wherein the hydrogen peroxide is fed as an aqueous solution at 70-1% by weight and wherein the oxidation is carried out in the presence of an organic solvent, water or a mixture of water and organic solvent selected from the group consisting of aliphatic and cycloaliphatic alcohols, having from 1 to 6 carbon atoms, and aliphatic and aromatic hydrocarbons having from 5 to 8 carbon atoms.

7. The process of claim 6, wherein said solvent is selected from the group consisting of methanol, ethanol, propanol, n-butanol, iso-butanol, ter-butanol, ter-amyl alcohol, cyclohexanol and toluene and wherein the ratio between the solvent and water has a value of from 0.5 to 200 in volume.

8. The process of claim 1, wherein the oxidation temperature ranges from 25° to 150° C.

9. The process of claim 1, wherein the particle size distribution of the catalyst is from 5 to 100 microns the quantity of catalyst being from 0.1 to 40 g for every 100 g of solution.

10. The process of claim 1, wherein the pressure is from 1 to 20 the reaction being carried out in an ammonia atmosphere, with or without an atmosphere of inert gas.

11. The process of claim 1, wherein the molar ratio of ammonia:hydrogen peroxide is from 200 to 0.5.

12. The process of claim 1, carried out in continuous or semi-continuous, in an isothermal slurry reactor.

13. The process of claim 1, carried out in an isothermal slurry reactor containing a filter element.

14. A process as defined in claim 5 where the concentration of the ammonia is from 30-5% by weight.

15. A process as defined in claim 6 where the concentration of the peroxide is 35-1% by weight.

16. A process as defined in claim 7 where the ratio between the solvent and water is from 4 to 50.

17. A process as defined in claim 9 where the quantity of catalyst is from 1-10 g for every 100 g. of solution.

18. A process as defined in claim 10 where the inert gas is nitrogen or argon.

19. A process as defined in claim 11 where the molar ratio of ammonia:hydrogen peroxide is from 160 to 0.9.

20. A process as defined in claim 13 where the filter element is a porous candle.

* * * * *